United States Patent [19]

Judd et al.

[11] Patent Number: 4,901,972
[45] Date of Patent: Feb. 20, 1990

[54] KEYBOARD STORAGE WITH SLIDING SHELF

[75] Inventors: Thomas W. Judd; Edward L. Hames, both of Peterborough, N.H.

[73] Assignee: Curtis Manufacturing Company, Inc., Jaffrey, N.H.

[21] Appl. No.: 321,513

[22] Filed: Mar. 9, 1989

Related U.S. Application Data

[63] Continuation-in-part of Ser. No. 299,749, Jan. 19, 1989.

[51] Int. Cl.⁴ .............................................. F16M 13/00
[52] U.S. Cl. ....................................... 248/918; 108/93; 248/176; 248/316.4; 248/639; 312/208; 400/682
[58] Field of Search .............. 248/1 B, 1 A, 1 C, 1 E, 248/1 J, 442.2, 176, 298, 316.2, 316.4, 639; 108/93, 102; 312/208; D6/449, 462, 474; D18/23; 400/691, 692, 718

[56] References Cited

U.S. PATENT DOCUMENTS

| | | | |
|---|---|---|---|
| D. 285,632 | 9/1986 | Axhamre | D6/474 |
| D. 287,678 | 1/1987 | Hatcher et al. | D6/474 |
| D. 290,717 | 7/1987 | Judd | D18/23 |
| D. 290,850 | 7/1987 | Yon et al. | D18/23 |
| D. 296,217 | 6/1988 | Drak et al. | D18/23 |
| 4,625,657 | 12/1986 | Little et al. | 108/93 |
| 4,635,893 | 1/1987 | Nelson | 248/1 B X |
| 4,644,875 | 2/1987 | Watt | 108/93 |
| 4,657,214 | 4/1987 | Foster | 248/176 |
| 4,709,972 | 12/1987 | LaBudde et al. | 312/302 X |
| 4,717,112 | 1/1988 | Pirkle | 248/639 |
| 4,755,010 | 7/1988 | Wilson et al. | 312/208 |
| 4,863,140 | 9/1989 | Schriner | 248/639 |

OTHER PUBLICATIONS

IBM Technical Disclosure Bulletin, vol. 22, No. 7, Dec. 1979.
*Demco*, Fall 1985, p. 49, Printer leg top left on page.

*Primary Examiner*—Ramon O. Ramirez
*Attorney, Agent, or Firm*—Richard P. Crowley

[57] ABSTRACT

A keyboard storage apparatus for supporting a keyboard and for moving the supported keyboard between a storage, non-use position and an extended, use position. The apparatus comprises a spaced apart pair of elements each including a support element having a side inverted U-shaped opening to store a keyboard therein; an elongated, slidable shelf adapted for slidable movement within the opening between a storage position wherein the keyboard is within the opening and a use position wherein the keyboard extends beyond the end of the support element; and a fixed front and adjustable back keyboard retainer on the shelf to retain the keyboard in position.

14 Claims, 3 Drawing Sheets

KEYBOARD STORAGE WITH SLIDING SHELF

This is a continuation-in-part of copending application Ser. No. 07/299,749 filed on Jan. 19, 1989.

BACKGROUND OF THE INVENTION

Keyboards or similar data entry devices are typically employed with computers, copiers and printers. They keyboard is not in use at all times, and therefore, it is desireable to store the keyboard when not in use, but in a manner so that the keyboard is readily available for use if required.

Often, computer work stations provide support and an area to mount both the display screen and the keyboard for the screen, such as shown in U.S. Design Pat. No. 283,323, issued Apr. 9, 1986 and U.S. Pat. No. 4,717,112 issued Jan. 5, 1988.

Slidable, retractable supports for computers with a keyboard are described in various U.S. patents as follows: U.S. Pat. No. 3,732,965, issued May 15, 1973 directed toward a telegraph transceiver with a retractable keyboard; U.S. Pat. No. 4,657,214, issued Apr. 14, 1987 directed to a movable mounting stand for a keyboard beneath a computer display screen; U.S. Pat. No. 4,709,972, issued Dec. 1, 1987, which shows a slidable tray for a keyboard with a dust cover; U.S. Pat. No. D266,672, issued Oct. 26, 1982 showing a retractable keyboard and display screen console; and U.S. Pat. No. D298,678, issued Jan. 13, 1987, showing a computer stand with a sliding keyboard shelf.

It is desirable to provide a new and improved compact, portable keyboard storage apparatus which may be employed either above or below the work surface and which has advantages in use and operation not possessed by prior art keyboard storage devices.

SUMMARY OF THE INVENTION

The invention relates to a keyboard storage apparatus and system. In particularly, the invention concerns a simple, easily operated, inexpensive computer keyboard storage system which may be used to store the keyboard either on or below a work surface.

The keyboard apparatus comprises a side inverted U-shaped support element having an elongated opening from one end toward the other end and of sufficient height and depth to permit the storage in the opening of a computer keyboard therein and which support element opening includes a lower surface and an opening which extends into and toward the other end of the support element. The apparatus includes an elongated shelf to support a keyboard thereon which shelf is disposed for slidable movement in the opening and one the lower surface of the support element opening. The shelf includes an upright, fixed, retention element at the one end and a slidably adjustable, upright security clamp on the shelf toward the other end to permit adjustment of the space therebetween required for the keyboard, the keyboard therein securely retained between the rigid retention element at one end and the secured security clamp on the shelf. The slidable shelf is designed to store the keybaord thereon in a storage, non-use position within the U-shaped opening with the other end of the shelf extending into the space beyond the U-shaped opening of the support element. The slidable shelf is designed to slide outwardly between the closed storage position and an extended use position.

The storage apparatus includes screw holes at each end so that the upper surface of the support element can be secured by screws or other means to the underside of a work surface, such as a computer desk top. The support element includes larger openings at each end and a larger opening at the open end of the shelf aligned with the screw holes in the upper surfaces to permit the blade of a screwdriver to be inserted therethrough for the easy installation of the apparatus.

In addition, the storage apparatus includes on the shelf surface raised rib element so that the computer keyboard is tilted slightly forward toward the user on the shelf and against the upright retention element for ease in using the keyboard. The apparatus optionally also includes resilient, non-skid, soft pads of foam or rubber material on the upper and lower surfaces to provide a non-scratch surface and non-skid slidability to the apparatus when it is used as a work surface with the computer display screen or other device placed on the top of the apparatus. The storage apparatus is designed to be used in pairs which are spaced apart in parallel arrangement and typically entirely molded of high impact polymer, like styrene polymer.

The storage apparatus permits keyboards, such as computer keyboards or the like, to be stored either below a desk top to create more desk top space or on a desktop and to provide both a storage space for the keyboard as well as non-skid, non-scratch support base for a printer or typically, a computer screen directly above the keyboard. The storage apparatus with undercover storage protects the stored keyboard from spills and debris. The apparatus permits typing by the user at desktop level or a lower level. The apparatus provides for the secure retention and positioning of the keyboard in use and can be adjusted to fit a variety of different size computer or other keyboards.

The computer keyboard apparatus and system will be described for the purpose of illustration only in connection with certain embodiments; however, it is recognized that various changes, modifications, additions and improvements may be made in the illustrated embodiments by those persons skilled in the art without departing form the spirit and scope of the invention.

DESCRIPTION OF THE EMBODIMENTS

Figure 1:
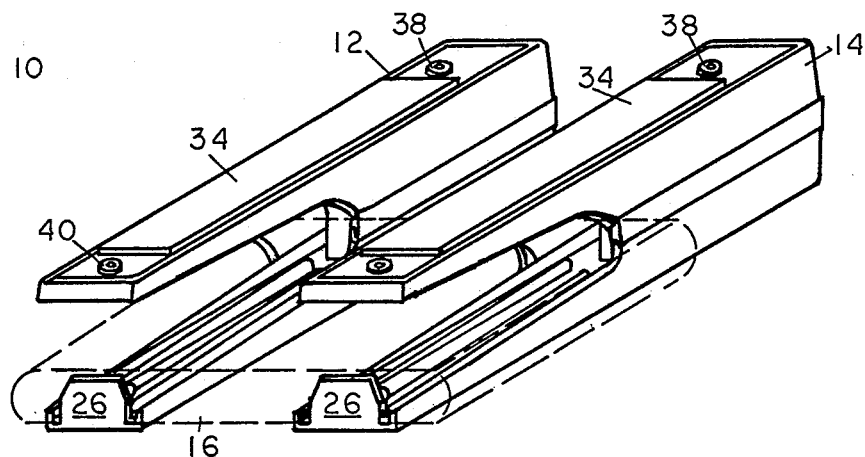
FIG. 1 is a perspective view from above of a pair of keyboard storage apparatus of the invention in the storage position.
Figure 2:
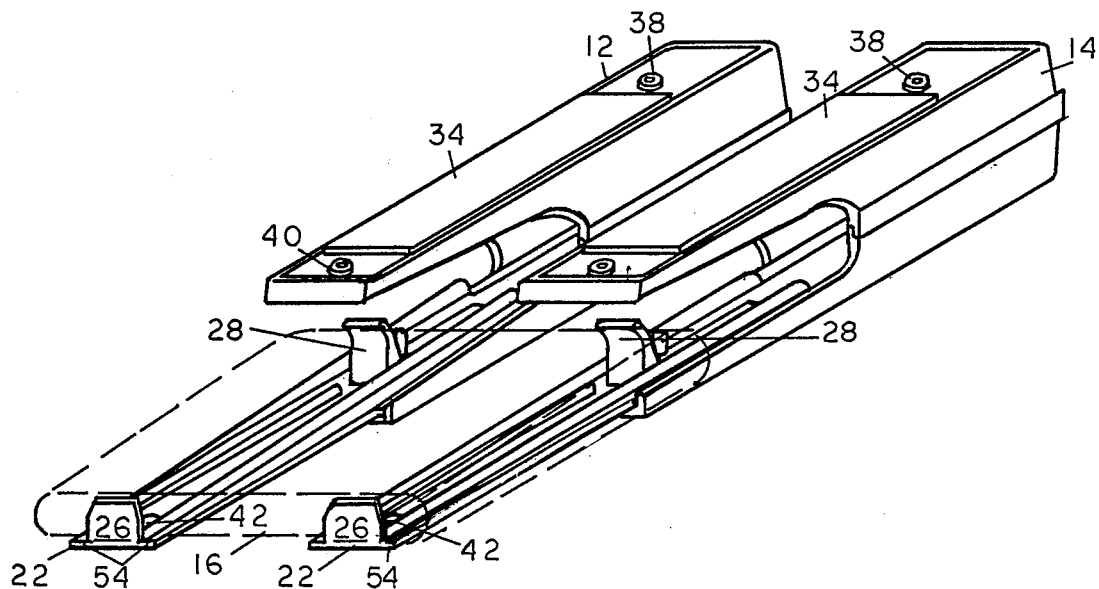
FIG. 2 is a perspective view from above of a pair of keyboard storage apparatus of the invention in the extended, use position.
Figure 3:
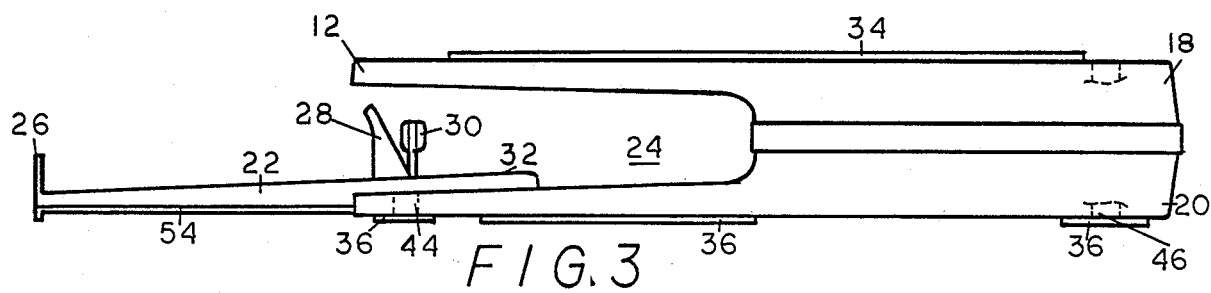
FIG. 3 is a side elevational view of one keyboard storage apparatus of FIG. 2.
Figure 4:
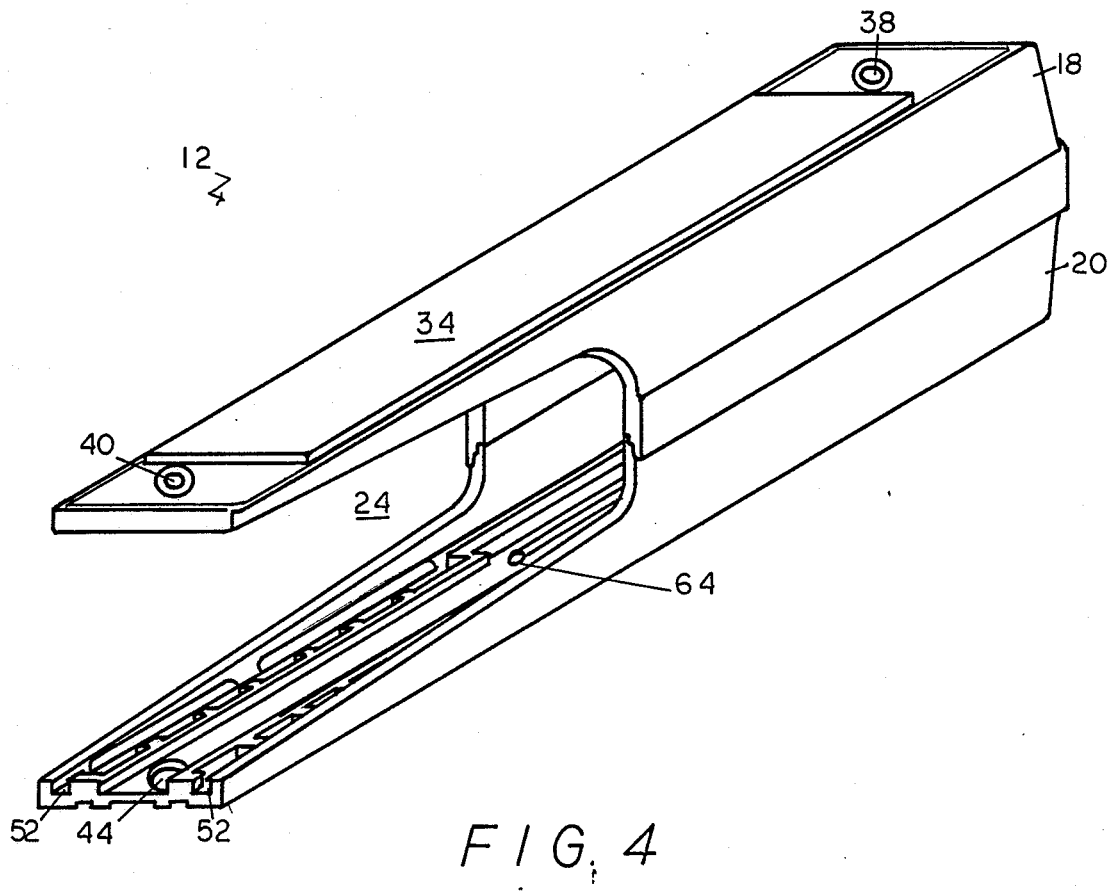
FIG. 4 is a perspective view of one keybaord storage apparatus without the slidable shelf.
Figure 5:
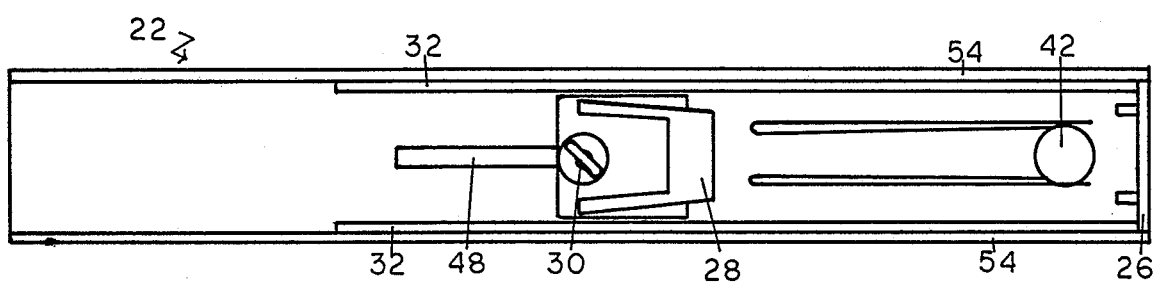
FIG. 5 is a perspective view from above of the slidable shelf used in the storage apparatus.
Figure 6:
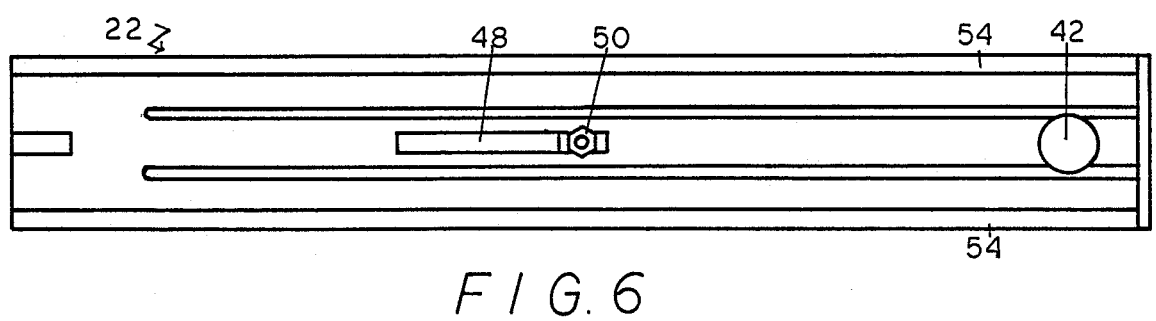
FIG. 6 is a bottom plan view of the shelf of the storage apparatus.

FIGS. 1 and 2 show a keyboard storage system 10 comprising two parallel, spaced apart storage apparatus or holders 12 and 14 for the storage of a computer keyboard 16 shown in dotted outline form. The storage apparatus 14 and 12 are core molded of a high impact plastic, like polystyrene, generally in two hollow pieces, and fitted and secured together. The storage apparatus has screw holes 38 and 40 in the upper support surface for the use of screws (not shown) to secure the upper surface to the lower surface of a work table 58 (see FIG. 8). The storage apparatus includes non-skid, resilient cushioning pads 34, such as of rubber or foam, on the upper surface to cushion and prevent movement of a display screen or computer 60 (see FIG. 7) placed on the top surface when the storage apparatus is used on the top surface of a work station and to prevent noise or vibration when the storage apparatus is secured to the lower surface of the work station 58 (see FIG. 8). Another pad 36 on the lower surface of the support apparatus prevents movement, encloses and stabilizes the storage apparatus when placed on the top surface of a work station 58 (see FIG. 7).

FIGS. 3-6 show in greater detail one of the storage apparatus 12 or 14 composed of two molded, fitted, hollow, plastic elements 18 and 20 to form the side inverted U-shaped space opening in opening 24. The storage apparatus includes a slidable keyboard storage shelf 22 having an integral molded, fixed, upright retention element 26 at the one free end to retain the keyboard 16 on the shelf. The shelf 22 includes a slidably adjustable keyboard upright end clamping element 28, adjustable to meet the depth of the keyboard 16 to be stored. The shelf 22 has an elongated slot 48, an upright hand screw 30 for loosening for movement and tighten to fix of adjusting the clamping element 26 which hand screw 30 extends through the back portion of the clamping element 22 and the slot 48 and has a bolt 50 at the other end. Turning of the hand screw loosens or tightens the clamping element for adjustment to a desired position on the shelf. The shelf 22 is designed to tilt the stored keyboard slightly forward, e.g. 5° to 15°, toward the user and has a plurality of spaced apart sides or rib elements 32 on the upper surface of the shelf 22 for ease in the installation of the storage apparatus in the system of FIG. 8, i.e. beneath a work surface. The shelf 22 has an enlarged screwdriver hole 42 at the one end which in the non-use, stored position of the shelf is aligned with a similar screwdriver hole 44 in the support element 20. The other end of element 20 also has a similar screwdriver hole 46. These screwdriver holes 42, 44 and 46 permit the easy insertion of the blade end of the screwdriver so that screw (not shown) can be screwed into the lower surface of the work station 58. The shelf 22 is designed to extend about the length of the support and for easy, slidable movement on the lower inner surface of the storage apparatus between the keyboard non-use and use positions. The shelf 22 includes outwardly extending side ribs 54 which matingly fit into side channels 52 on the molded element 20 to permit slidable movement of the shelf 22. If desired, other means can be used to permit slidable movement. The molded element 20 also includes a raised central tab element 64 designed to block the further outward movement of the shelf in the storage position when the bolt head 50 strikes the tab element 64 to position the one free end of the shelf 22 with the free end of the lower molded element 20.

Figure 7:
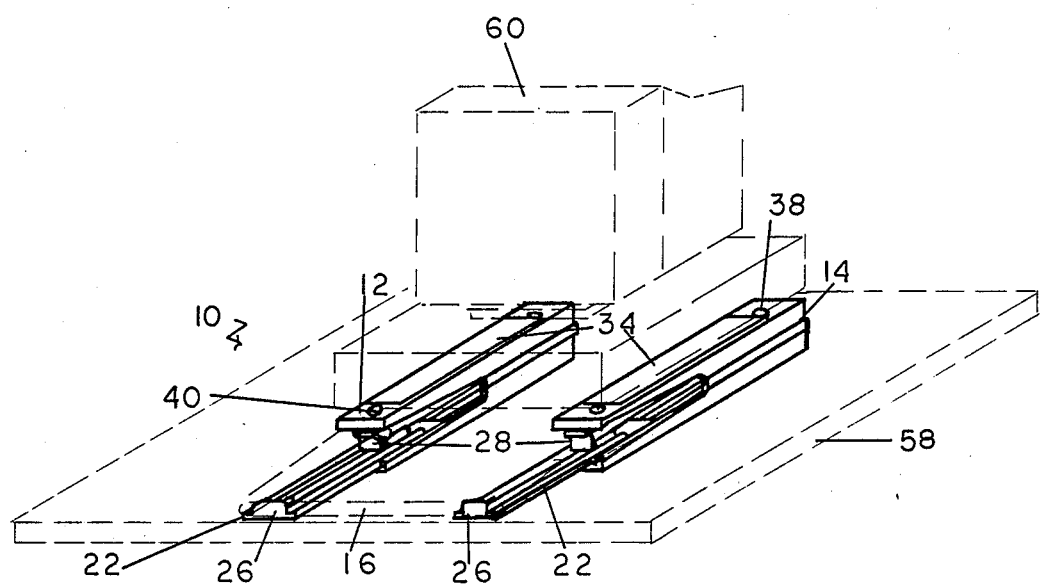
FIG. 7 is a perspective view of a pair of keyboard storage apparatus in use on a desk top.

FIG. 7 shows the use of the storage apparatus 12 and 14 on the upper surface of a work table 58, with a computer shown in dotted lines positioned on the storage apparatus with the keyboard 16 in the use position.

Figure 8:
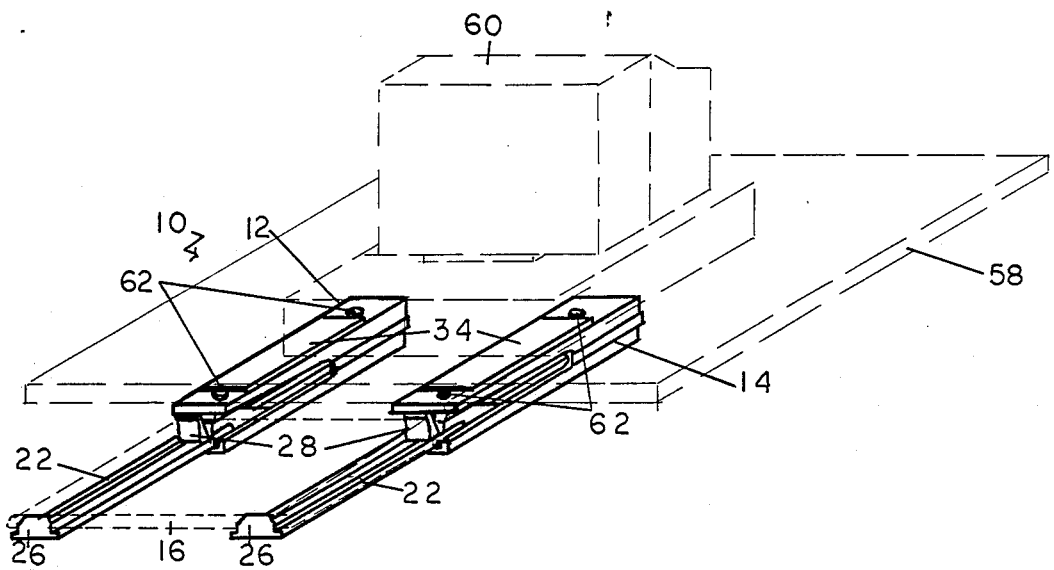
FIG. 8 is a perspective view from above of a pair of keyboard apparatus in use below a work surface.

FIG. 8 shows the use of the storage apparatus 12 and 14 secured to the lower surface of the work table 58 by screws 62 through screw holes 38 and 40 with the keyboard illustrated in the use position.

The keyboard storage apparatus and system of the invention provide a simple, easily installed, effective, compact keyboard storage apparatus for use above or below a work station surface.

What is claimed is:

1. A keyboard storage apparatus for supporting a keyboard and for moving the supported keyboard between a storage, non-use position and an extended, use position, which apparatus comprises:
    (a) an elongated keyboard support element having sides, a top and bottom and one and other end, the support characterized by a generally side inverted, U-shaped opening extending from the one end inwardly toward the other end, said opening sufficient to store a keyboard therein and defining an inner bottom surface of said support element;
    (b) an elongated, slidably movable shelf means to support the keyboard and having a one and other end and extending substantially the length of the support element, the shelf adapted for slidable movement of the shelf means on the inner bottom surface between a keyboard non-use storage position wherein the shelf means with the keyboard are stored within the said opening and the shelf means extends into said hollow space and a keyboard use position wherein a part of the shelf means and the keyboard extend beyond the one end of the support element to permit use of the keyboard; and
    (c) retention means on the shelf means at the one and other end to retain securely the keybaord on the shelf means between the keyboard non-use storage and keyboard use positions.

2. The apparatus of claim 1 which includes a means on the surface of the shelf means to tilt the keyboard slightly forward and toward the user at the one end of the shelf means for ease in use.

3. The apparatus of claim 2 wherein the means to tilt comprises a plurality of elongated, sloping, spaced apart, generally parallel, raised ribs on the surface of the shelf means.

4. The apparatus of claim 1 wherein the support comprises elongated, raised ribs on the one inner bottom surface between a pair of spaced apart, U-shaped channels and outward, flared lower ribs on the shelf means which mate with the shelf means which fit into the said channels.

5. The apparatus of claim 1 wherein the retention means comprises an upright, fixed keyboard stopping element at the one free end of the shelf means to prevent the keyboard from extending beyond the one free end of the shelf means.

6. The apparatus of claim 5 wherein the retention means includes a slidably mounted, securable, upright clamping means on the shelf means and toward the other end of the shelf means to permit the slidable adjustment on the shelf means and the securing of the keyboard on the shelf means in the space between the upright stop element and the clamping means.

7. The apparatus of claim 1 which includes means to secure the upper surface of the support element to the lower surface of a desk top surface.

8. The apparatus of claim 7 which includes:
    (a) screw holes at each end of the support element and on the upper surface to permit the securing of the top surface of the support element to the lower surface of a desk top surface by screws; and (b) larger holes on the lower surface of the support element and at the one end of the shelf means the larger holes aligned with the upper screw holes to permit the use of a screwdriver through said larger holes to screw in the screws.

9. The apparatus of claim 1 which includes resilient cushioning means on the upper and lower surface of the support element to permit the support element to rest in a cushioned, non-slidable manner on a desk top surface and to receive a display screen on the upper surface.

10. The apparatus of claim 6 wherein the clamping means comprises:
 (a) an upright extension element;
 (b) screw means on the extension element; and
 (c) the shelf means, including an elongated slot therein, the bottom section of the screw means retained in the slot whereby the extension element and screw means are slidably adjustable in the slot and the extension element can be secured in a desired position in the slot by the tightening of the screw means.

11. A keyboard storage system which comprises in combination:
 (a) a pair of spaced apart storage apparatus of claim 1; and
 (b) a keyboard secured on the shelf means of the said storage apparatus.

12. The system of claim 11 which includes:
 a computer monitor apparatus for use with the keyboard,
 the computer monitor mounted on the top surface of the pair of the storage apparatus of claim 1.

13. The system of claim 11 which includes:
 (a) a horizontal work surface having a top and bottom surface;
 (b) a computer monitor apparatus for use with the keyboard on the top surface of the work surface; and
 (c) means to secure the upper surface of the support elements of a pair of said spaced apart storage apparatus to the lower surface of the work surface and below the computer monitor apparatus.

14. A keyboard storage apparatus for supporting a keyboard and for moving the supported keyboard between a storage, non-use position and a use position, which apparatus comprises:
 (a) an elongated, generally hollow, plastic keyboard support element having sides, a top and a bottom and a one and other end, the support element characterized by a generally side inverted, U-shaped opening extending from the one end inwardly toward the other end, the said opening sufficient to store a keyboard therein and defining an inner bottom surface and an upper top surface, the support element having screw holes at the one and other end so that the upper surface may be secured to the lower surface of work support station;
 (b) an elongated, slidably movable and mounted shelf means to support the keyboard on the lower inner surface, the shelf means adapted for slidable movement on the inner bottom surface between a keyboard non-use, storage position wherein the one inner end of the shelf means extends within the hollow support element and toward the other end of the support element and a keyboard use position wherein a substantial part of the length of the shelf means extends outwardly beyond the one end of the support to permit the use of the keyboard;
 (c) keyboard tilting means on the shelf means to tilt the storage keyboard slightly forward and toward the user in the use position;
 (d) cushioning, non-skid means on the upper and lower outside surfaces of the support element to receive a display screen device on the upper surface and to provide a cushion for the lower surface on a work surface; and
 (e) retention means on the shelf means to retain the keyboard securely on the shelf means to include a fixed, upright retention element at the one end of the shelf means and a slidably adjustable, upright clamping element toward the other end of the shelf means.

* * * * *